United States Patent
Kroiss et al.

[11] Patent Number: 5,916,298
[45] Date of Patent: Jun. 29, 1999

[54] DISPLAY UNIT FOR DATA DEPENDENT ON A VEHICLE'S ENERGY CONSUMPTION

[75] Inventors: Hugo Kroiss, Groebenzell; Manfred Bigalke, Vaterstetten; Guenther Tuschl, Kolbermoor, all of Germany

[73] Assignee: Bayerische Motoren Werke Aktiengesellscaft, Muenchen, Germany

[21] Appl. No.: 08/979,954

[22] Filed: Nov. 26, 1997

Related U.S. Application Data

[63] Continuation of application No. PCT/EP97/00821, Feb. 20, 1997.

[30] Foreign Application Priority Data

Mar. 27, 1996 [DE] Germany ............ 192 12 062

[51] Int. Cl.⁶ .................................................. G01M 13/26
[52] U.S. Cl. ........................ 701/123; 73/113; 73/114
[58] Field of Search ................................ 701/123, 102, 701/104; 73/116, 117.2, 117.3, 113, 114

[56] References Cited

U.S. PATENT DOCUMENTS

| | | | |
|---|---|---|---|
| 4,217,644 | 8/1980 | Kato et al. ............................ | 73/113 |
| 4,400,779 | 8/1983 | Kosuge et al. ........................ | 701/123 |
| 4,564,905 | 1/1986 | Masuda et al. ....................... | 701/123 |
| 4,663,718 | 5/1987 | Augello et al. ....................... | 701/201 |
| 5,301,113 | 4/1994 | To et al. ............................... | 701/123 |
| 5,734,099 | 3/1998 | Saigo et al. .......................... | 73/114 |

FOREIGN PATENT DOCUMENTS

| | | |
|---|---|---|
| 0 097 337 | 1/1984 | European Pat. Off. . |
| 23 57 770 | 6/1975 | Germany . |
| 27 36 465 | 2/1979 | Germany . |
| 29 01 348 | 8/1979 | Germany . |
| 28 35 429 | 2/1980 | Germany . |
| 30 46 076 | 9/1981 | Germany . |
| 30 46 079 | 7/1982 | Germany . |
| 32 45 752 | 6/1983 | Germany . |
| 38 37 592 | 5/1990 | Germany . |
| 39 36 373 | 5/1991 | Germany . |
| 57-190221 | 2/1983 | Japan . |

*Primary Examiner*—George Dombroske
*Attorney, Agent, or Firm*—Evenson, McKeown, Edwards & Lenahan, P.L.L.C.

[57] ABSTRACT

A system, method, and display device for displaying an expected range of driving distances for a vehicle having a driving unit and an energy storage unit. A sensor senses an amount of remaining energy in the energy storage unit. An average minimum energy consumption rate and an average maximum energy consumption rate of the driving unit are determined based on at least one of (a) vehicle-specific energy consumption parameters; and (b) driver-specific energy consumption parameters. A minimum expected driving distance is calculated based on the sensed amount of remaining energy and the average maximum energy consumption rate. A maximum expected driving distance is calculated based on the sensed amount of remaining energy and the average minimum energy consumption rate. The expected range of driving distances defined by the minimum expected driving distance and the maximum expected driving distance are displayed on a display unit.

22 Claims, 4 Drawing Sheets

DISPLAY UNIT FOR DATA DEPENDENT ON A VEHICLE'S ENERGY CONSUMPTION

CROSS-REFERENCE TO RELATED APPLICATIONS

This application is a continuation of PCT Application No. PCT/EP97/00821 filed on Feb. 20, 1997.

BACKGROUND AND SUMMARY OF THE INVENTION

This application claims the priority of German Application No. 196 12 062.4, the disclosure of which is expressly incorporated by reference herein.

The invention relates to a display unit for data dependent on the energy consumption of a vehicle.

From German Patent Document DE-PS 30 46 076, a fuel display unit is known which has devices for measuring, analyzing and displaying the instantaneous fuel consumption and the resulting data. The following is specifically indicated: the tank limit in the case of the instantaneous driving condition on the basis of constant circumstances in the form of a display of figures; the fuel quantity contained in the fuel tank in the form of figures; the flashing of a colored light when a minimum quantity of fuel is reached; and the display of the instantaneous fuel consumption by lights of three different colors, in which case the lights indicate during the flashing whether the fuel consumption is within, below or above a predetermined range. In the case of this tank limit display, it is a disadvantage that the indicated numbers change constantly because of changing driving conditions and thus may irritate the driver and divert his attention. It is another disadvantage that these so-called vehicle computers, as a rule, are offered only in the case of higher-priced vehicles or as optional equipment.

It is an object of the invention to provide a display unit for data dependent on a vehicle's energy consumption which, in a clear manner, displays the most important data dependent on the energy consumption and the contents of the energy storage device.

This and other objects have been achieved according to the present invention by providing a display unit for data dependent on energy consumption of a vehicle, the vehicle having at least one motor and at least one storage system which can be filled with energy, having devices for determining a remaining amount of energy instantaneously situated in said storage system and consumption parameters of the vehicle, and having devices for calculating a driving distance which can be reached with said remaining amount of energy and said consumption parameters, wherein, as a function of said amount of remaining energy in the storage system and as a function of said consumption parameters, the display unit displays a range of said driving distances which is obtained from a minimal and a maximal average consumption of the motor.

This and other objects have also been achieved according to the present invention by providing a system for displaying an expected range of driving distances for a vehicle having a driving unit and an energy storage unit, comprising a sensor which senses an amount of remaining energy in said energy storage unit; means for determining an average minimum energy consumption rate and an average maximum energy consumption rate of said driving unit; means for calculating a minimum expected driving distance based on said sensed amount of remaining energy and said average maximum energy consumption rate; means for calculating a maximum expected driving distance based on said sensed amount of remaining energy and said average minimum energy consumption rate; means for displaying said expected range of driving distances defined by said minimum expected driving distance and said maximum expected driving distance.

This and other objects have also been achieved according to the present invention by providing a method of displaying an expected range of driving distances for a vehicle having a driving unit and an energy storage unit, comprising sensing an amount of remaining energy in said energy storage unit; determining an average minimum energy consumption rate and an average maximum energy consumption rate of said driving unit; calculating a minimum expected driving distance based on said sensed amount of remaining energy and said average maximum energy consumption rate; calculating a maximum expected driving distance based on said sensed amount of remaining energy and said average minimum energy consumption rate; displaying said expected range of driving distances defined by said minimum expected driving distance and said maximum expected driving distance.

The display unit according to the invention has a driving distance display which indicates to the driver a range of driving distance still to be expected, for example, in kilometers. In a first embodiment of a display unit, this driving distance range is obtained as a function of the amount of energy instantaneously situated in the energy storage system and the minimal and maximal average consumption of the vehicle engine in conjunction with the vehicle-specific parameters.

In a second embodiment of a display unit according to the invention, in the case of the indicated driving distance range, the driver-specific characteristics are also taken into account. These driver-specific characteristics may, for example, be sporty or economical driving methods. For example, from an empirically determined range of an average consumption, which covers a predetermined percentage, for example, between 50–75%, of a driver's vehicle handling, the driving distance range is limited resulting from the vehicle-specific average consumption. A further limitation of this resulting driving distance range is achieved in that, over a certain time period, the vehicle handling is measured and analyzed of a driver fixedly assigned to the vehicle. From these data, a minimal and maximal average consumption is determined and is used for calculating the driving distance range. The indicated driving distance range will then become even narrower.

In the case of both embodiments, it is advantageous that, because of the display of the driving distance range of the vehicle, the indication of the instantaneous energy amount in the storage system or in the energy tank can be eliminated and the driver knows directly from the indicated driving distance range how far he can expect to still drive with the still existing stored energy as a function of the vehicle's consumption and under various operating conditions.

It is another advantage that a display of driving distance range jumps in the case of a changed driving method or changed driving conditions is eliminated because the indication of a range contains these variable parameters. If a vehicle is, for example, driven by different drivers, as occurs in the case of a rented car, the respective driver can immediately see which driving distance can still be maximally expected without knowing the consumption of the engine and the total content of the fuel tank.

In an advantageous embodiment, the display of the minimal or maximal driving distance takes place by means of an indicator instrument with two arms which can be controlled independently of one another. In another advantageous embodiment, the display of the driving distance range takes place by way of a bar display with a highlighted area, in which case the highlighting can take place in color and/or in an illuminated manner. In a third advantageous embodiment, the indication of the driving distance range takes place by way of a digital display in the form of mutually spaced numbers.

In an advantageous embodiment, the driving distance scale is divided in an enlarged manner starting from the range of the reserve quantity so that the driver can more precisely estimate the possible driving distance. It is also advantageous for the range scale in the upper range, in which a relatively large amount of energy is still contained in the energy tank, to have a smaller or narrower graduation. The energy reserve quantity can be displayed in that the display color is changed. As a result, a separate reserve light can be eliminated.

In an advantageous embodiment, the driving distance to be expected with the instantaneous or current driving method is visually displayed within the highlighted or displayed driving distance range.

Another advantageous embodiment of the display unit is characterized in that the indicated driving distance range is limited or shortened by a constant or variable percentage. In a space-saving embodiment, the upper range of the driving distance scale is cut off, which in particular relates to the driving distance in the case of a particularly economical driving method; that is, the maximal driving distance starts with an average or median value.

It is advantageous that, in the case of the display unit according to the invention, the limit values of the average consumptions used as the basis can be varied automatically by way of a corresponding software during the driving operation. If the analysis device of the display unit according to the invention determines that there is an exceeding of or falling below the empirically determined limit values, the limited driving distance range is expanded and adapted to these limit values.

In a further embodiment, in addition to the driving distance range, the amount of energy instantaneously contained in the energy tank is also displayed or can be queried.

Other objects, advantages and novel features of the present invention will become apparent from the following detailed description of the invention when considered in conjunction with the accompanying drawings.

DETAILED DESCRIPTION OF THE DRAWINGS

Figure 1A:
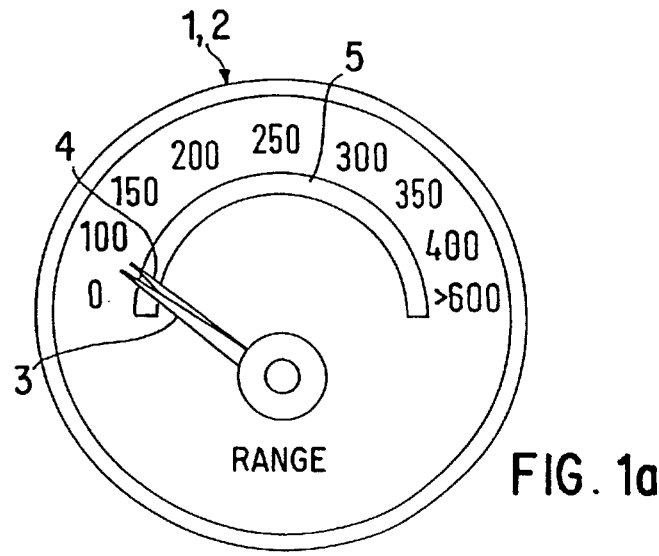
FIGS. 1a, b and c are each views of an indicator instrument according to a preferred embodiment having a double arm and a linear driving distance scale, the double arms indicating the driving distance range, specifically the driving distance range in the case of an energy reserve quantity, in the case of a half-filled energy tank, and in the case of a completely filled energy tank.
Figure 1B:
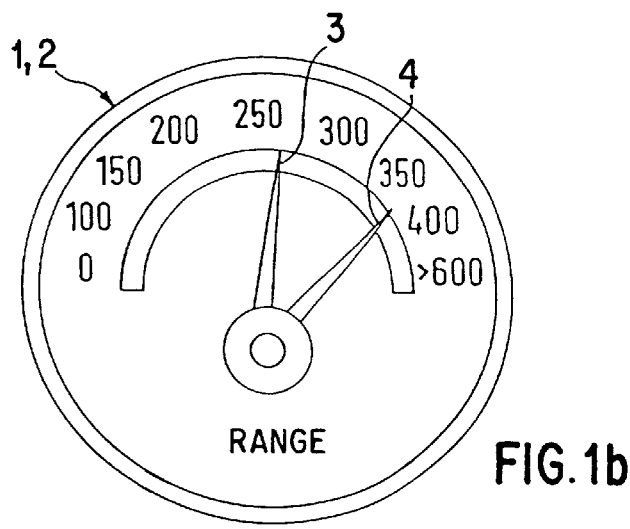
Figure 1C:
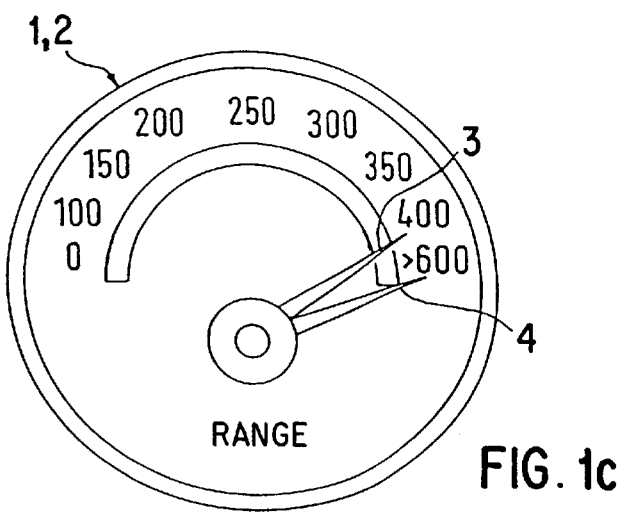

FIGS. 1a, 1b and 1c each show a display device 1 constructed as an indicator instrument 2 having two arms 3 and 4. The indicator instrument 2 is provided with a linear driving distance scale 5. The indicator instrument 2 is constructed as a round instrument. The arms 3 and 4 are controlled separately from one another and can be moved separately from one another.

FIG. 1a shows a driving distance range in the case of an energy reserve quantity. As illustrated in FIG. 1a, the two arms 3 and 4 are relatively close together because of the small driving distance range.

FIG. 1b indicates a driving distance range when the storage system or the energy tank is half filled. Because of the relatively high energy reserve, the two arms 3 and 4 are relatively far apart in comparison to the position in FIG. 1a.

The driving distance range shown in FIG. 1c is limited. As in the other FIGS. 1a and 1b, the arm 3 indicates the minimal driving distance. However, in contrast to FIG. 1a and 1b, the arm 4 does not indicate the maximal driving distance but a driving distance below it. This driving distance can be determined as an average value, for example, from experimental values.

Figure 2A:
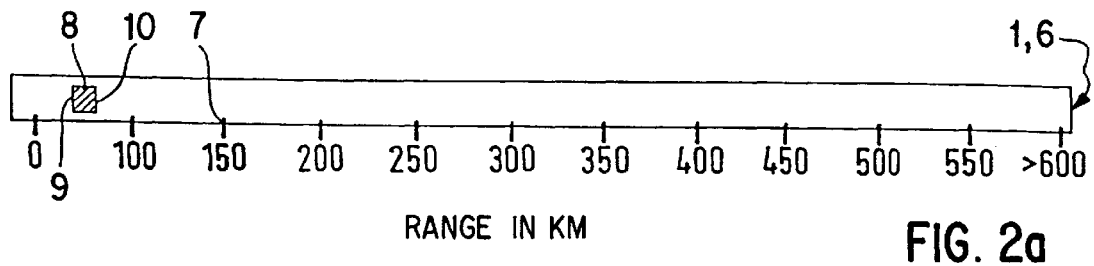
FIGS. 2a, b and c are each views of a bar display having a linear driving distance scale with a highlighted driving distance range, specifically the driving distance range in the case of an energy reserve quantity, in the case of a half-filled energy tank, and in the case of a completely filled energy tank.
Figure 2B:
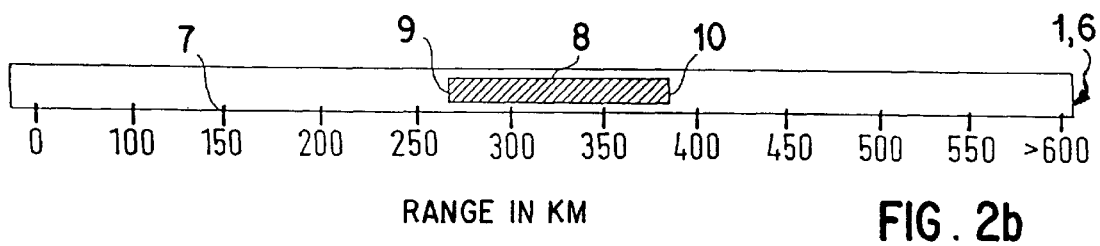
Figure 2C:
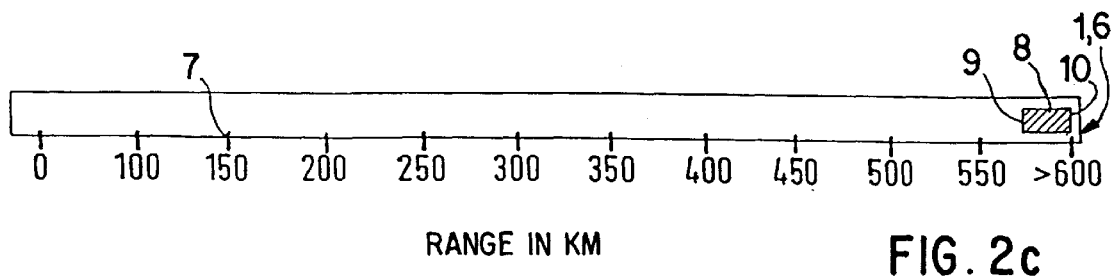

FIGS. 2a, 2b and 2c relate to a display device 1 which is constructed as a bar display 6. The bar display 6 also has a linear driving distance scale 7. The driving distance range is illustrated by a visually highlighted bar 8. The highlighting takes place, for example, by an illumination of the driving distance range resulting from the existing amount of energy. As in the case of the indicator instrument 2, the tank limit scale 7 ends at a driving distance which is below the maximally possible driving distance. Like the arm 3, the bar 8 also shows the minimal driving distance by means of its left boundary line 9. In FIGS. 2a and 2b, the right boundary line 10 represents the maximal driving distance. Only in FIG. 2c, the right boundary line 10 is displaced toward the left boundary line 9. When the bar of FIG. 2b is compared with the bar of FIG. 2a, it is found that, in the case of a half-filled energy tank, the bar 8 is correspondingly long, while, in the case of a small amount of energy, the bar 8 is correspondingly short. This leads in a simple manner to a larger limitation of the possible driving distance.

Figure 3:
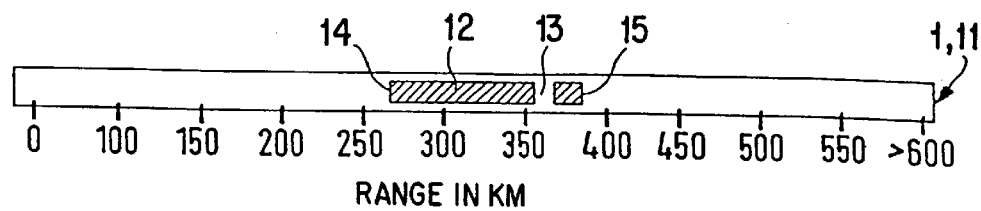
FIG. 3 is a view of a bar display corresponding to FIG. 2b, in which case the highlighted driving distance range is divided into two parts by a cutout or a window and in which case this window indicates the driving distance to be expected in the case of the current driving method.

FIG. 3 shows a bar display 11 similar to the bar display 6 of FIG. 2a to 2c, but with the difference that one bar 12 of the bar display 11 which indicates the driving distance range is provided with a window 13 which indicates the driving distance to be expected in the case of the current driving method. In addition, the bar 12 has a left and a right boundary line 14 and 15 which represents the minimal and the maximal driving distance.

Figure 4:
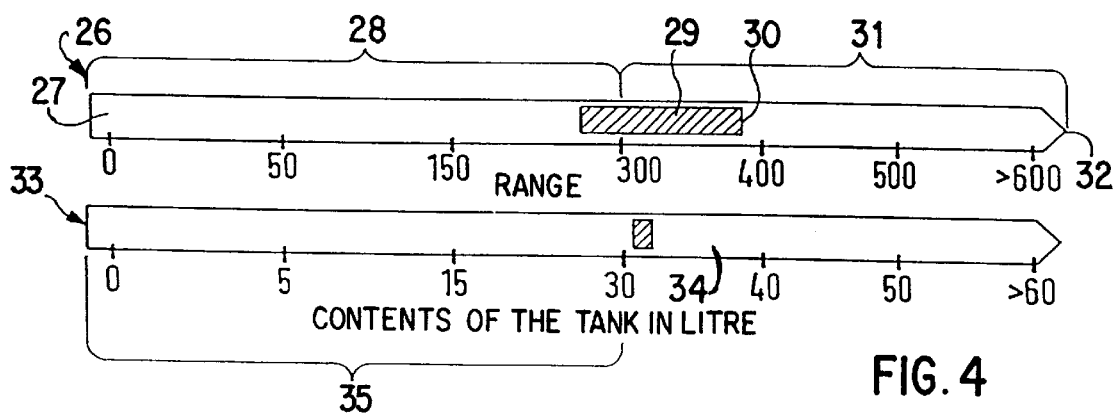
FIG. 4 is a view of a bar display combined with a display of the energy amount situated in the storage system.

FIG. 4 illustrates a bar display 26 in the case of which the driving distance scale 27 in its lower range 28, for example, between 0 and 300 kilometers, is non-linearly divided. By the expansion of this lower range 28 and the narrowing of the bar 30 indicating the driving distance range 29, the remaining driving distance is relatively precisely bounded. In contrast to the bar display of FIG. 3, the driving distance scale 27 is provided on its end 32 bounding the upper range 31 with a point which symbolizes that, in the case of a correspondingly economical method of driving, the driving distance is larger than the indicated numerical value of 600. Directly below the bar display 26, a display device 33 is illustrated for the amount of energy instantaneously situated in the storage system or in a tank. The scale 34 of the tank content display device 33 is non-linearly divided corresponding to the driving distance scale 27 in that a lower range 35, for example, between 0 to 50% of the tank content, is shown at a larger scale. The lower range 35 of the tank content display device 33 is adapted in its division, i.e. scale, to the lower range of the driving distance scale 27 of the bar display 26, which is also the case for the corresponding upper ranges.

Figure 5:
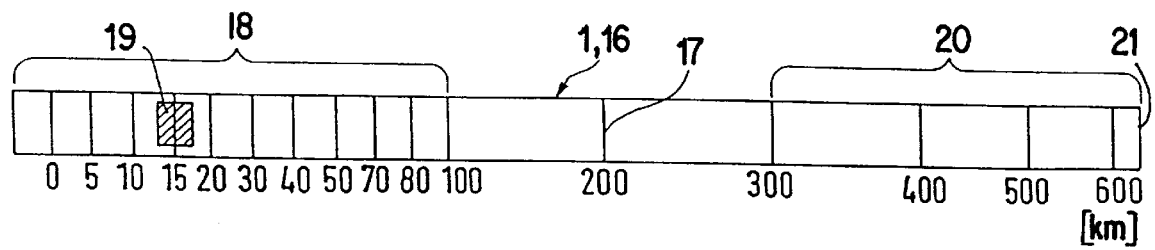
FIG. 5, is a view of a bar display with a non-linear driving distance scale.

FIG. 5 shows a bar display 16 in the case of which the driving distance scale 17 has a non-linear construction. In FIG. 5, the scale in the lower range 18 of the driving distance scale 17 is very enlarged. In the example illustrated in FIG. 5, the driving distance scale for the last 100 kilometers is very spread. A bar 19 covers a driving distance range whose average value is at approximately 15 kilometers. In the upper range 20 of the driving distance scale 17, which extends approximately from scale division 300 to the end 21 of the driving distance scale 17 at a driving distance indication of >600, the scale is increasingly reduced.

Figure 6:
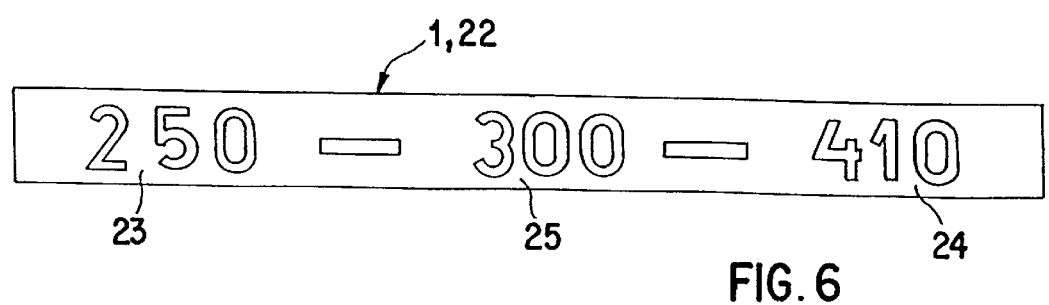
FIG. 6 is a view of a digital display with the minimal and the maximal driving distances as well as the driving distance to be expected in the case of the current driving method.

FIG. 6 shows a display device 1 which is constructed as a digital display 22. The two outer numerical values 23, 24 indicate the minimal and the maximal driving distances for the remaining energy supply. The center numerical value 25 indicates the driving distance to be expected with the actual method of driving.

All display units have in common that in the upper range of a large tank limit, because of the high supply of energy or fuel, there is a large difference between a maximally possible driving distance and a minimally possible driving distance, this difference being caused, for example, by an economical driving method or by a sporty driving method. The indicated driving distance range is the narrower and thus the more limited, the lower the energy supply.

For determining the driving distance range, the respective level of the energy tank is required as the input signal; that is the instantaneously existent energy quantity and the vehicle-specific and possibly the driver-specific consumption parameters. In the case of the limitation of the driving distance range by taking into account a general driver-specific consumption parameters, as a rule, the driving distance range is laid out to a general value, for example, to 75% of all concerned drivers. In addition, a narrowed-down driving distance range can be optimized also by way of the calculation of the actual consumption during the driving operation. For displaying the driving distance range, an instantaneous display can be shown in the display unit which corresponds to the actual energy consumption.

As the result of the display unit, separate driving distance range indicators, warning lights and/or instantaneous consumption indicators can be eliminated. The display unit can be used for all energy types which can be processed by an engine, irrespective of whether the energy is obtained from gasoline, diesel, electric current, solar energy or gas, etc.

Figure 7:
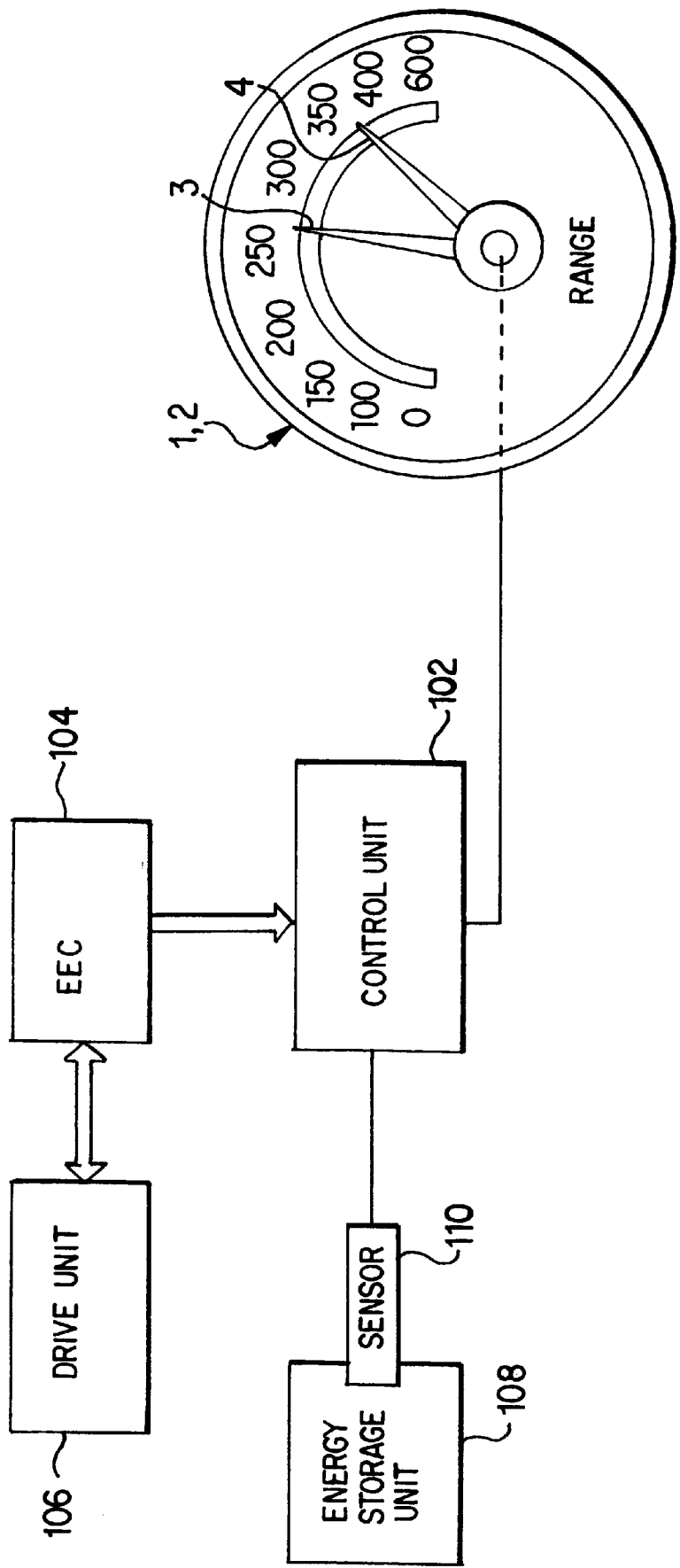
FIG. 7 is a schematic view of a system for displaying the expected driving distance range.

A system for displaying an expected range of driving distances is shown in FIG. 7. The display device 1 is connected to a control unit 102, which controls the respective angular positions of the arms 3, 4. The control unit 102 receives information regarding the energy consumption of the drive unit 106 via, for example, an electronic control unit 104. The information received from the electronic control unit 104 includes, for example, any parameters related to the energy consumption of the drive unit, such as fuel flow rate, as well as information regarding vehicle speed, acceleration, and distance travelled. The control unit 102 may be a general purpose processor programmed with instructions that cause the processor to perform the desired steps, specific hardware components that contain hard-wired logic for performing the desired steps, or any combination of programmed general purpose computer components and custom hardware components. Although the control unit 102 is shown separate from the electronic control unit 104, the control unit 102 may alternatively be incorporated into or comprise a portion of the electronic control unit 104.

The control unit 102 also receives information regarding the amount of remaining energy in energy storage unit 108 via, for example, an energy level sensor 110. Although the energy level sensor 110 is shown connected directly to the control unit 102, the energy level sensor 110 may alternatively be connected to the electronic control unit 104.

The control unit 102 includes means for determining an average minimum energy consumption rate and an average maximum energy consumption rate of said driving unit; means for calculating a minimum expected driving distance based on said sensed value of remaining energy and said average maximum energy consumption rate; and means for calculating a maximum expected driving distance based on said sensed value of remaining energy and said average minimum energy consumption rate.

The control unit 102 determines the average minimum energy consumption rate and the average maximum energy consumption rate of the driving unit as a function of at least one of: (a) vehicle-specific energy consumption parameters; and (b) driver-specific energy consumption parameters. The control unit 102 calculates a minimum expected driving distance based on the value of remaining energy sensed by the sensor 110 and the average maximum energy consumption rate. The control unit 102 calculates a maximum expected driving distance based on the value of remaining energy sensed by the sensor 110 and the average minimum energy consumption rate. The control unit 102 controls the arms 3, 4 of the display device 1 such that arm 3 points to the calculated minimum expected driving distance and such that arm 4 points to the calculated maximum expected driving distance.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A display unit for data dependent on energy consumption of a vehicle, the vehicle having at least one motor and at least one storage system which can be filled with energy, having devices for determining a remaining amount of energy instantaneously situated in said storage system and consumption parameters of the vehicle, and having devices for calculating a driving distance which can be reached with said remaining amount of energy and said consumption parameters, wherein, as a function of said amount of remaining energy in the storage system and as a function of said consumption parameters, the display unit displays a range of said driving distances which is obtained from a minimal and a maximal average consumption of the motor.

2. A display unit according to claim 1, wherein at least one of said minimal and said maximal average consumptions are limited by a defined value.

3. A display unit according to claim 2, wherein said defined value is limited by driver-specific limit values.

4. A display unit according to claim 2, wherein said defined value by which said minimal and said maximal average consumptions and said displayed driving distance range is limited, is determined empirically.

5. A display unit according to claim 1, wherein said driving distance range is displayed on an indicator instrument having two arms which can be controlled and moved independently of one another.

6. A display unit according to claim 1, wherein said driving distance range is displayed on a bar display as a visually highlighted bar.

7. A display unit according to claim 1, wherein said driving distance range is displayed on a digital display.

8. A display unit according to claim 1, wherein the display unit is provided with a driving distance scale which is linearly divided.

9. A display unit according to claim 1, wherein the display unit is provided with a driving distance scale which is non-linear.

10. A display unit according to claim 1, wherein an expected driving distance based on an actual method of driving is displayed within said driving distance range.

11. A display unit according to claim 1, wherein said display unit compares said minimal and maximal average consumption values with actual limit values based on actual consumption, and, when said actual limit values fall outside of said minimal and said maximal average consumption values, uses the actual limit values for calculating said driving distance range.

12. A display unit according to claim 1, wherein, starting from a lower driving distance value, the display visually changes to heighten the driver's attention.

13. A display unit according to claim 1, wherein the upper range of the tank limit scale is cut off which, in particular, concerns the tank limit in the case of a particularly economical method of driving.

14. A display unit according to claim 1, wherein, in addition to the tank limit range, the amount of energy instantaneously situated in the storage system can also be displayed or queried in the display unit.

15. A system for displaying an expected range of driving distances for a vehicle having a driving unit and an energy storage unit, comprising:
  a sensor which senses an amount of remaining energy in said energy storage unit;
  means for determining an average minimum energy consumption rate and an average maximum energy consumption rate of said driving unit;
  means for calculating a minimum expected driving distance based on said sensed amount of remaining energy and said average maximum energy consumption rate;
  means for calculating a maximum expected driving distance based on said sensed amount of remaining energy and said average minimum energy consumption rate; and
  means for displaying said expected range of driving distances defined by said minimum expected driving distance and said maximum expected driving distance.

16. A system according to claim 15, wherein said means for displaying comprises a driving distance scale and two arms, one of said arms being controlled to point to a value on said scale corresponding to said minimum expected driving distance and the other of said arms being controlled to point to a value on said scale corresponding to said maximum expected driving distance.

17. A system according to claim 15, wherein said means for displaying comprises a driving distance scale and a bar display adjacent or on said scale, said bar display being controlled such that a bar displayed thereon has a first end adjacent or on a value on said scale corresponding to said minimum expected driving distance and such that said bar has a second end adjacent or on a value on said scale corresponding to said maximum expected driving distance.

18. A system according to claim 15, wherein said average minimum energy consumption rate and said average maximum energy consumption rate of said driving unit are determined based on at least one of:
  (a) vehicle-specific energy consumption parameters; and
  (b) driver-specific energy consumption parameters.

19. A method of displaying an expected range of driving distances for a vehicle having a driving unit and an energy storage unit, comprising:
  sensing an amount of remaining energy in said energy storage unit;
  determining an average minimum energy consumption rate and an average maximum energy consumption rate of said driving unit;
  calculating a minimum expected driving distance based on said sensed amount of remaining energy and said average maximum energy consumption rate;
  calculating a maximum expected driving distance based on said sensed amount of remaining energy and said average minimum energy consumption rate; and
  displaying said expected range of driving distances defined by said minimum expected driving distance and said maximum expected driving distance.

20. A method according to claim 19, wherein said displaying step comprises displaying said expected range of driving distances on a display unit including a driving distance scale and two arms, further comprising:
  controlling one of said arms to point to a value on said scale corresponding to said minimum expected driving distance; and
  controlling the other of said arms to point to a value on said scale corresponding to said maximum expected driving distance.

21. A method according to claim 19, wherein said displaying step comprises displaying said expected range of driving distances on a display unit including a driving distance scale and a bar display adjacent or on said scale, further comprising:
  controlling said bar display such that a bar displayed thereon has a first end adjacent or on a value on said scale corresponding to said minimum expected driving distance and such that said bar has a second end adjacent or on a value on said scale corresponding to said maximum expected driving distance.

22. A method according to claim 19, wherein said determining step comprises determining said average minimum energy consumption rate and said average maximum energy consumption rate of said driving unit based on at least one of:
  (a) vehicle-specific energy consumption parameters; and
  (b) driver-specific energy consumption parameters.

* * * * *